April 30, 1935.  G. M. NELL  1,999,662
MUCK DEFLECTOR FOR DRILLS
Filed Feb. 24, 1931
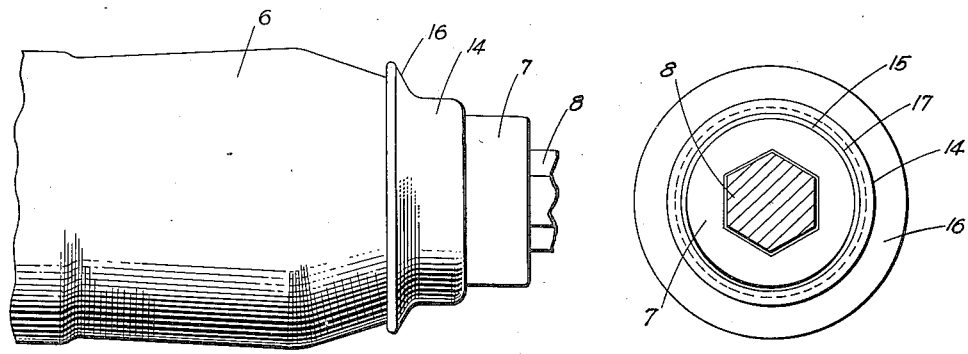
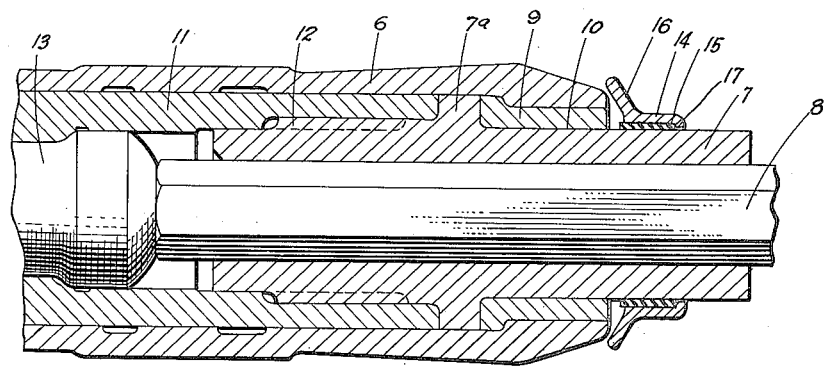
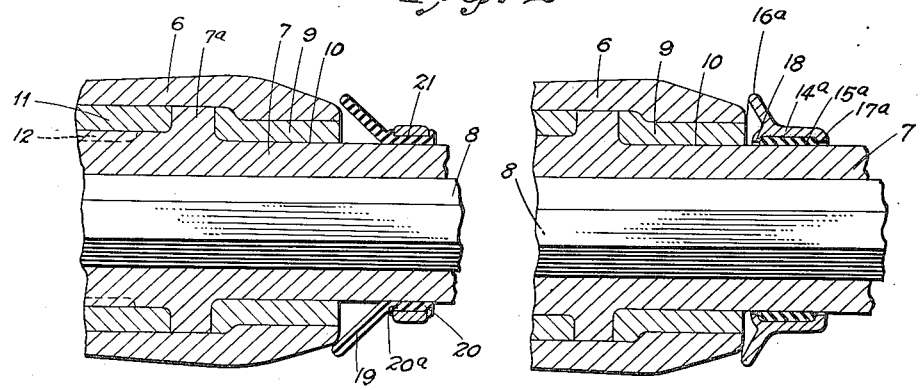
INVENTOR.
Gustave M. Nell
BY
Ira L. Nickerson
ATTORNEY.

Patented Apr. 30, 1935

1,999,662

UNITED STATES PATENT OFFICE 1,999,662

MUCK DEFLECTOR FOR DRILLS

Gustave M. Nell, Detroit, Mich., assignor to Chicago Pneumatic Tool Company, New York, N. Y., a corporation of New Jersey Application February 24, 1931, Serial No. 517,672

1 Claim. (Cl. 121—10)

This invention relates to drilling machines of the type used for driving vertical or vertically inclined holes, which machines are commonly referred to as stoping drills or stopers. More particularly it concerns detachable apparatus for keeping muck, grit, cuttings, and the like out of the forward end of such machines.

Among the objects of the invention are to provide a simple form of muck deflector which is inexpensive to manufacture and easy to apply, which has a smooth exterior, and which will maintain its position of adjustment, and in general to improve prior devices in the interest of more efficient and satisfactory service.

The invention involves the use of a simple deflector device which is readily applied to the forward end of the machine. It takes the form of a rigid ring and a resilient ring in telescoping engagement with each other. The resilient ring which is preferably of rubber or a rubber compound is within the rigid ring and when the device is in place it is compressed between the rigid ring and the machine to grip the latter and offer great frictional resistance to movement thereon. A deflecting skirt may be attached to or form an integral part of either ring. In the preferred form the outer ring is of metal and the deflecting skirt is a flared portion thereof.

In order to illustrate the invention concrete embodiments thereof are shown in the accompanying drawing, in which:

Fig. 1 is a fragmentary side elevational view of the front end of a stoping drill;

Fig. 2 is a longitudinal sectional view of the parts shown in Fig. 1;

Fig. 3 is an end elevational view of the parts shown in Fig. 1; and

Figs. 4 and 5 are fragmentary sectional views showing modifications.

The invention is disclosed as applied to a conventional stoper drill having a front head 6 from which projects a rotatable chuck sleeve 7 having a bore receiving the polygonal shank of drill steel 8. A bushing 9 is pressed into the outer end of front head 6 to provide a bearing at 10 for chuck sleeve 7 which has a radially extending stop flange 7a engaging the inner end face of bushing 9. The reduced inner portion of chuck sleeve 7 has telescoping engagement with chuck 11 rotatably mounted within front head 6. Chuck sleeve 7 is caused to rotate with chuck 11 by means of an interengaged spline arrangement at 12. Chuck 11 is rotated by any desired or known mechanism (not shown) and the blow of the percussive element (not shown) may be transmitted to steel 8 through an anvil block 13 mounted in chuck 11.

The muck excluding and deflecting means shown in its preferred form in Figs. 1-3 comprise telescopingly engaged outer and inner ring members 14 and 15 sleeved as a unit over the projecting portion of chuck sleeve 7. Outer ring 14, which is preferably of hard rigid material such as metal is formed at its rearward end with an annular flaring flange or skirt 16 which projects radially over and beyond the end of front head 6. Its forward end is inturned to form a stop flange 17 defining one end of the annular recess in which elastic ring 15 is disposed. The minimum internal diameter of ring 14, as at flange 17, is greater than the external diameter of chuck sleeve 7 so that outer ring 14 is freely slidable thereover. The internal diameter of elastic ring 15, however, is less than the external diameter of chuck sleeve 7 so that when rings 14 and 15 are assembled in nested telescoped arrangement and the assembly is forced over the projecting end of chuck sleeve 7, elastic ring 15 is compressed between outer ring 14 and the chuck sleeve, thereby establishing a frictional grip therebetween so that the deflector is securely maintained in adjusted position in spite of the vibration of the machine and of the shocks and blows incident to service.

To insure the removal of the inner elastic ring with the outer ring when it is necessary to remove the deflector, as when chuck sleeve 7 is to be renewed, a slight modification may be made in the outer ring as indicated in Fig. 5. Here outer ring 14a has both a forward inturned flange 17a and in addition a rearward inturned flange 18 within the annular flaring extension or skirt 16a so that elastic ring 15a is confined within an annular recess in ring 14a having stop flanges at both ends.

In the modification shown in Fig. 4 the flaring extension or skirt 19 is attached to or forms a part of the inner elastic ring 20. The latter has an annular recess 20a cut or moulded into its exterior, in which is seated the outer ring 21, in the present instance in the form of a relatively narrow band of rigid material such as metal.

From the above it will be apparent that the outer ring member of the deflector assembly provides a rigid wall devoid of sharp projections, that the inner elastic ring is of a size tightly to fit the object to which the deflector is to be applied such as the chuck sleeve or the shank of the drill steel and to be compressed between the object and the outer ring, that the degree of frictional resistance to movement of the assembly on the object may be varied as desired by the thickness and the composition of the inner elastic ring, that either ring may provide a recess for the other, and that the flaring deflector extension or skirt may be attached to or form a part of either ring.

In assembling the two rings it has been found that by the use of lubricant on both rings a much tighter elastic ring can be readily forced into telescoping relation with the outer ring than is possible without the use of lubricant. When once in place, the deflector of this invention is the equivalent of a known arrangement in which a split deflector is compressed over an elastic ring by means of a bolt and it accomplishes the same and even better results since it is obviously simpler, stronger, and cheaper to make. When used with a revolving chuck such as illustrated in the drawing, it has the marked advantage of providing no revolving projections to cause injury to the operator. Further for applying the deflector assembly it is not necessary to groove or otherwise weaken the chuck sleeve. This is an important consideration since all rock drill parts should be of full strength by reason of the exceptionally severe usage to which they are subjected. In practice, the combination of frictional engagement of the rubber ring under pressure and its resiliency cooperate to prevent movement of the complete deflector assembly in a longitudinal as well as a rotary direction.

While the invention has been herein disclosed in what are now considered to be preferred forms, it is to be understood that the invention is not limited to the specific details thereof but covers all changes, modifications, and adaptations within the scope of the appended claims.

I claim as my invention:

In a rock drilling machine having a front head and a tool receiving chuck sleeve extending therebeyond and rotatable therein, the extending portion of the chuck sleeve having a smooth cylindrical periphery, a muck deflecting device sleeved over said chuck sleeve adjacent said front head, said deflecting device comprising a funnel-shaped member of rubber or rubber compound having a cylindrical portion adapted to snugly embrace said chuck sleeve and a flaring portion extending axially and radially away from said cylindrical portion, the external surface of the cylindrical portion having an annular groove terminating in a flange at each end thereof and a rigid one-piece unbroken ring seated in said groove and engaging said flanges and adapted to hold the rubber member tightly on said chuck sleeve.

GUSTAVE M. NELL.